(12) United States Patent
Benner et al.

(10) Patent No.: US 9,494,763 B2
(45) Date of Patent: Nov. 15, 2016

(54) OPTICAL FIBER ROUTING MAT

(71) Applicant: International Business Machines Corporation, Armonk, NY (US)

(72) Inventors: Alan F. Benner, Poughkeepsie, NY (US); Mark A. Brandon, Poughkeepsie, NY (US); Eric J. McKeever, Poughkeepsie, NY (US); Edward J. Seminaro, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/613,900

(22) Filed: Feb. 4, 2015

(65) Prior Publication Data

US 2016/0223773 A1    Aug. 4, 2016

(51) Int. Cl.
G02B 6/00 (2006.01)
G02B 6/44 (2006.01)
G02B 6/36 (2006.01)

(52) U.S. Cl.
CPC ........... *G02B 6/4478* (2013.01); *G02B 6/3608* (2013.01)

(58) Field of Classification Search
CPC .................................................. G02B 6/3608
See application file for complete search history.

(56) References Cited

U.S. PATENT DOCUMENTS

| 5,701,380 | A | 12/1997 | Larson et al. |
| 5,946,440 | A | 8/1999 | Puetz |
| 6,272,263 | B1 * | 8/2001 | Schricker ............ G02B 6/3608 385/114 |
| 6,356,697 | B1 | 3/2002 | Braga et al. |
| 6,360,050 | B1 | 3/2002 | Moua et al. |
| 6,792,190 | B2 | 9/2004 | Xin et al. |
| 6,944,387 | B2 | 9/2005 | Howell et al. |
| 6,968,097 | B2 * | 11/2005 | Arima ..................... G02B 6/43 385/137 |
| H2144 | H * | 2/2006 | Baechtle ........................ 385/14 |
| 7,352,921 | B2 | 4/2008 | Saito et al. |
| 7,455,463 | B2 | 11/2008 | Togami et al. |
| 7,697,811 | B2 | 4/2010 | Murano et al. |
| 7,756,382 | B2 | 7/2010 | Saravanos et al. |
| 8,417,071 | B2 | 4/2013 | Hopkins et al. |
| 8,478,099 | B2 | 7/2013 | Rolston |
| 2002/0015563 | A1 | 2/2002 | Murakami et al. |
| 2004/0161212 | A1 * | 8/2004 | Sun ..................... G02B 6/4472 385/114 |
| 2012/0321255 | A1 | 12/2012 | Kewitsch |
| 2013/0287404 | A1 | 10/2013 | McColloch et al. |

OTHER PUBLICATIONS

U.S. Appl. No. 14/849,197, filed Sep. 9, 2015.

\* cited by examiner

*Primary Examiner* — Omar R Rojas
(74) *Attorney, Agent, or Firm* — Maeve Carpenter

(57) ABSTRACT

Aspects of the present invention include an optical fiber routing mat for routing optical fibers. The optical fiber routing mat includes a first layer of material and a second layer of material. A surface of the first layer of material is adhesively coupled to a surface of the second layer of material. The optical fiber routing mat includes one or more optical fibers disposed between the first layer of material and the second layer of material. The one or more optical fibers are bent to a radius at least large enough to prevent damage to the one or more optical fibers.

6 Claims, 10 Drawing Sheets

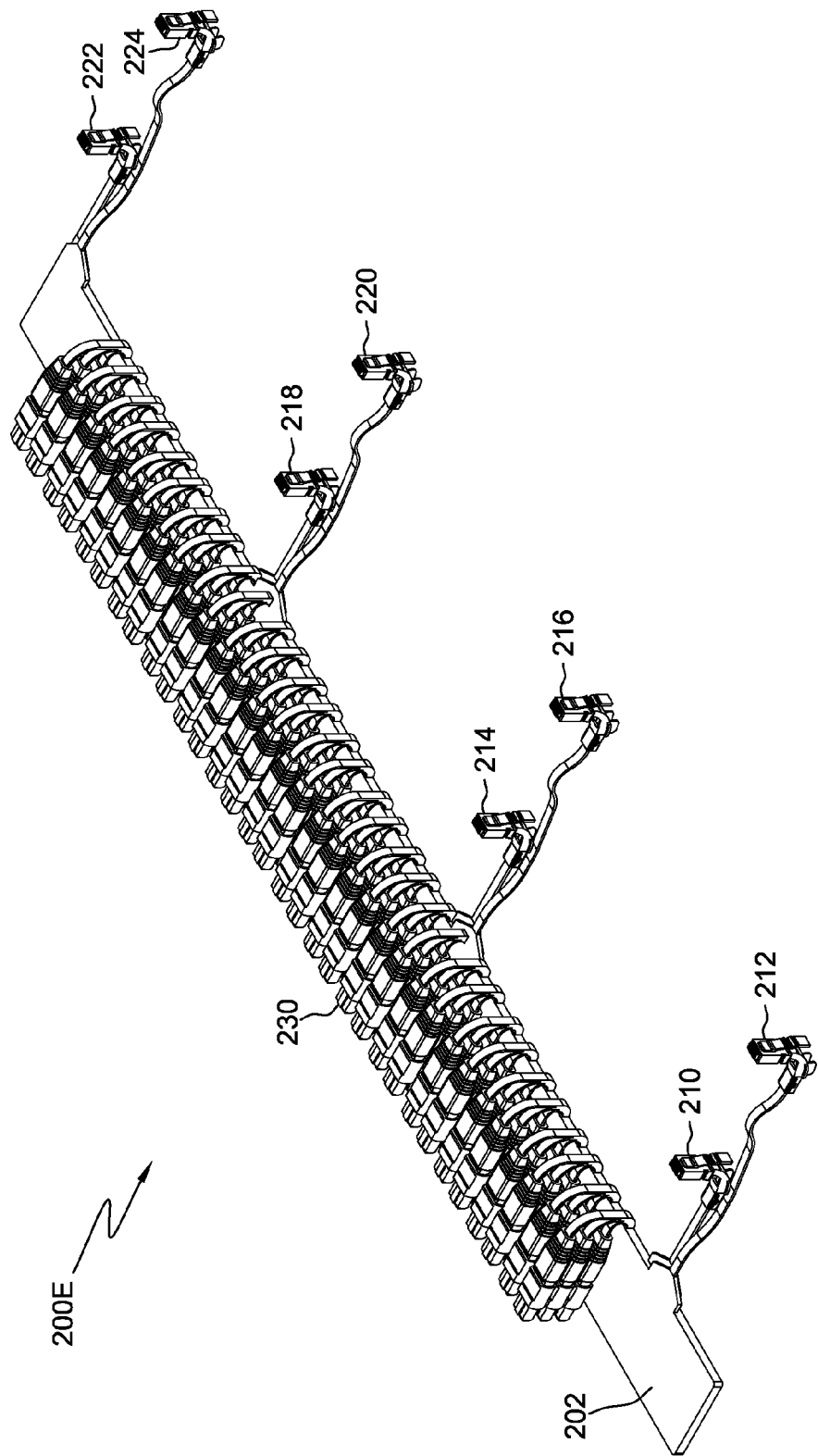

OPTICAL FIBER ROUTING MAT

STATEMENT REGARDING FEDERALLY SPONSORED WORK

This invention was made with United States Government support under contract number H98230-12-R-1048 entered with the following United States Governmental Agency: Department of Defense. The United States government has certain rights to this invention.

BACKGROUND OF THE INVENTION

The present invention relates generally to the field of optical communications, and more particularly to a structure for managing and organizing optical fiber interconnections.

Optical fibers are becoming more commonly used for signal transmission in communications and information handling applications. Optical fibers provide a large increase in the signal transmission bandwidth of a transmission cable over a given distance when compared with the bandwidth provided by conventional wire transmission cables. Because optical transmission cables do not experience frequency-dependent attenuation of signals to the extent that conventional wire transmission cables do, a greater amount of signal data can be transmitted over cables or signaling channels of comparable length. In addition, signal transmission through optical fibers provides improved density versus transmission through electrical wires, since, for a given bandwidth, the cross-sectional areas of optical fiber cables and connectors are significantly smaller than for comparable electrical cables. Connectors are used for joining light-transmitting optical fiber cables to transmitter devices, receiver devices or to other cables. In information handling applications, such as computer systems having large information storage capabilities, optical fiber transmission cables are used to provide connections between units of the computer system in order to most efficiently transmit large amounts of information from unit to unit.

Optical fibers have the disadvantage of being more physically fragile in some respects than metallic copper wire. For example, there is a limit on the minimum bend radius to which an optical fiber may be bent or curved before degradation in the light transmission through the fiber occurs. The optical fiber begins to leak light from the core due to the bend in the optical fiber. This loss of light from the optical fiber thereby increases the attenuation of the optical signals within the optical fiber. In addition, internal micromechanical stresses in the optical fiber caused by the tight bending can also physically degrade the optical fiber by reducing the amount of mechanical stress the optical fiber may endure prior to breaking. Therefore the handling and routing of optical fibers and cables requires extra precaution to ensure that the optical fibers are reliable at initial installation and over time.

SUMMARY

Aspects of the present invention include an optical fiber routing mat for routing optical fibers. The optical fiber routing mat includes a first layer of material and a second layer of material. A surface of the first layer of material is adhesively coupled to a surface of the second layer of material. The optical fiber routing mat includes one or more optical fibers disposed between the first layer of material and the second layer of material. The one or more optical fibers are bent to a radius at least large enough to prevent damage to the one or more optical fibers.

BRIEF DESCRIPTION OF THE DRAWINGS

FIG. 2E depicts an isometric view of a fifth example of an optical fiber routing mat, in accordance with an embodiment of the present invention;

DETAILED DESCRIPTION

Electronic devices, and specifically semiconductor chips, are becoming increasingly dense and capable of supporting increasing bandwidth. It is estimated that high performance chips may soon require thousands of signal input/output (I/O) channels. While some percentage of the I/Os can be implemented as electrical I/Os through printed circuit boards (PCB), the signal integrity limitations of electrical I/Os, due to resistance loss, emission, radiation, and crosstalk, indicate advantages to implementing a significant percentage of signal I/Os with optical signals. At the scale of density required by high performance electrical packages, optical fiber routing design is important. As optical transceivers are developed to support an increasing number of optical fibers, and optical fiber connectors are designed to match the increased density, the routing of optical fibers from connector to connector is challenging.

Embodiments of the present invention recognize that management and organization of a large quantity of optical fibers from a dense array of optical fiber connectors can be improved by providing a design for an optical fiber routing mat that provides a planar distribution of optical fibers with an adequate bend radius to prevent damage. Implementation of embodiments of the invention may take a variety of forms, and exemplary implementation details are discussed subsequently with reference to the Figures.

Embodiments of the present invention will now be described in detail with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the Figures are not necessarily to scale, and elements and features can have different dimensions than those depicted in the Figures. Therefore, specific structural and functional details disclosed herein are not to be interpreted as limiting, but merely as a representative basis for teaching one skilled in the art to variously employ the present invention.

References in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1A:
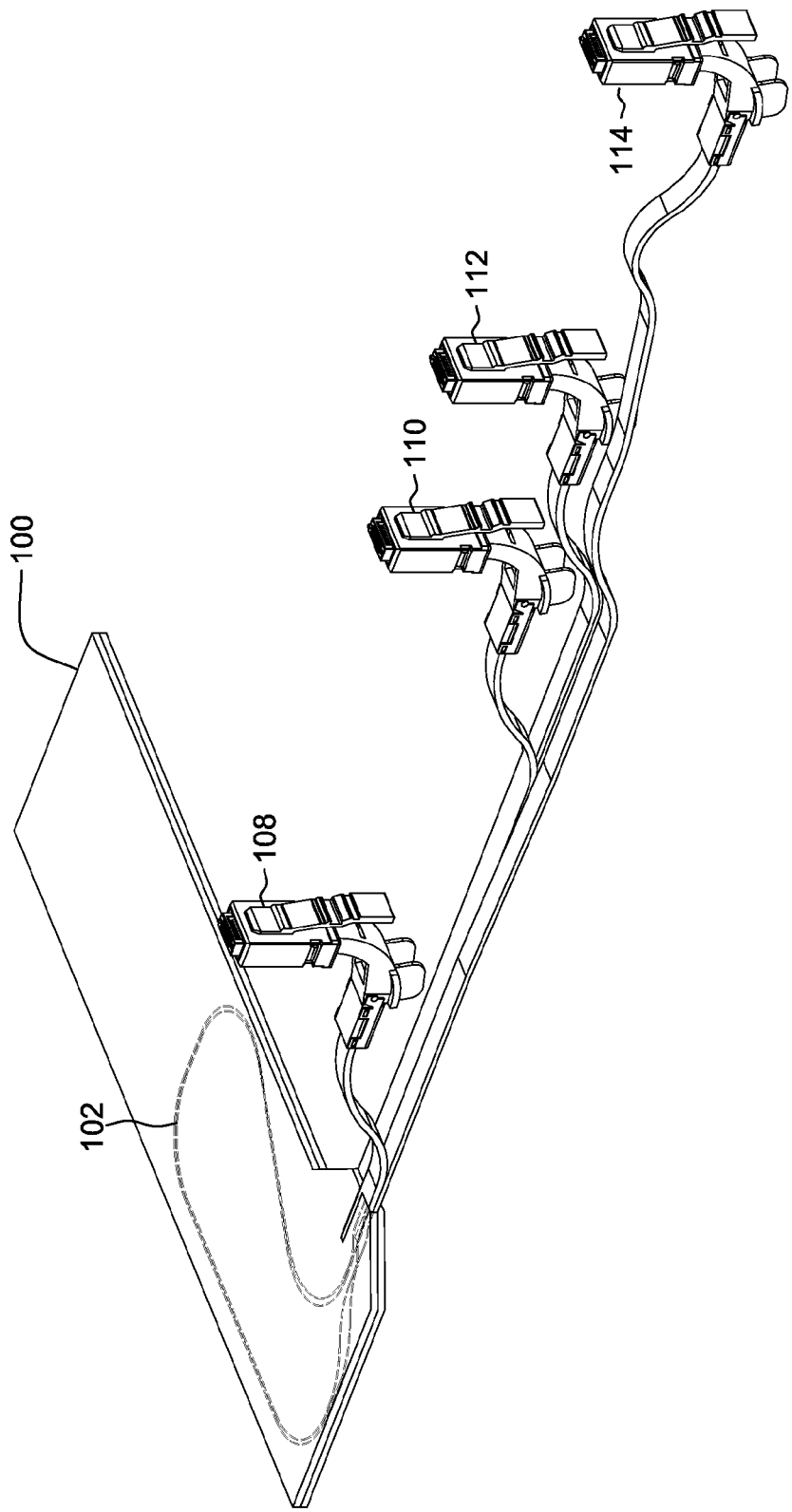
FIG. 1A depicts an isometric view of an optical fiber routing mat, in accordance with an embodiment of the present invention.
Figure 1B:
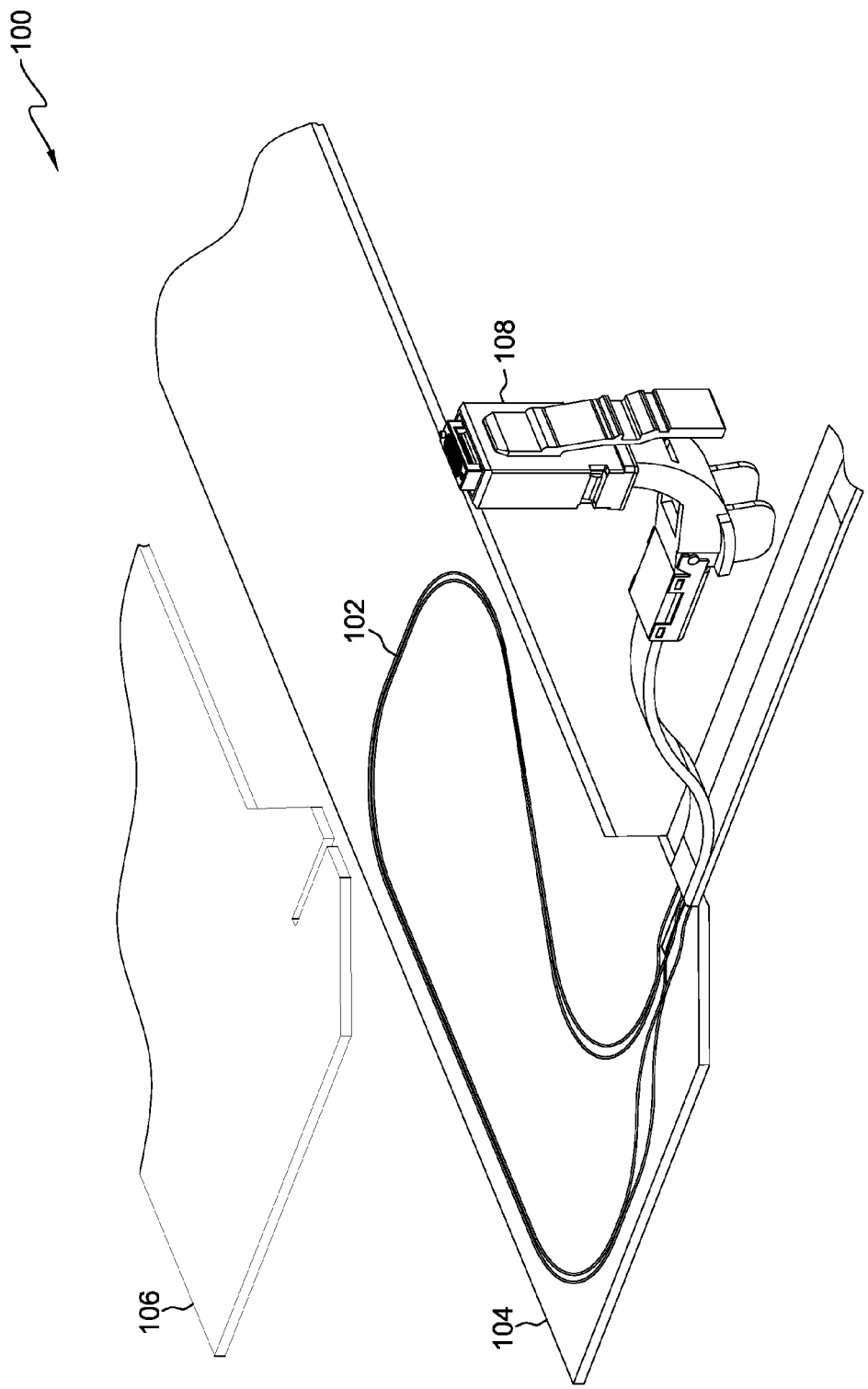
FIG. 1B depicts an exploded isometric view of the optical fiber routing mat, in accordance with an embodiment of the present invention.

FIGS. 1A and 1B provide an illustration of only one implementation and do not imply any limitations with regard to the different embodiments which may be implemented. Many modifications to the depicted embodiment may be made by those skilled in the art without departing from the scope of the invention as recited by the claims.

FIG. 1A depicts an isometric view of optical fiber routing mat 100, in accordance with an embodiment of the present invention. It should be noted that although optical fiber routing mat 100 is depicted as a rectangle in FIG. 1A, as well as subsequent Figures, optical fiber routing mat 100 may be any regular or irregular geometric shape. Optical fiber routing mat 100 includes optical fibers 102. Optical fibers 102 include optical fibers that emanate from optical fiber connectors 108, 110, 112, and 114 and the optical fiber ribbons associated with the optical fiber connectors. For clarity, in the depicted embodiment, optical fibers 102 includes two optical fibers as not all of the optical fibers emanating from optical fiber connectors 108, 110, 112, and 114 are shown. The optical fiber ribbons from optical fiber connectors 108, 110, 112, and 114 are stacked on each other such that the optical fibers from each optical fiber ribbon exit the optical fiber ribbons in a layer for each optical fiber ribbon and enter optical fiber routing mat 100 in proximity with each other in a single layer. The depicted embodiment includes four optical fiber connectors. In other embodiments, at least one and up to twelve optical fiber connectors may be routed through optical fiber routing mat 100. In an embodiment where each of twelve optical fiber connectors routing through optical fiber routing mat 100 includes 64 optical fibers (16 in each of four optical fiber ribbons), a total of 768 optical fibers are routed through optical fiber routing mat 100. In another embodiment, more than twelve optical fiber connectors may be routed through optical fiber routing mat 100. Optical fiber routing mat 100 enables routing of optical fibers from a first optical fiber connector to a second optical fiber connector in a planar structure that includes a large enough bend radius to protect the optical fibers from damage. The routing of optical fibers from one optical fiber connector to another enables high speed signal routing and interconnection of one or more integrated circuit (IC) package sites within one PCB or across one or more additional PCBs.

FIG. 1B depicts an exploded isometric view of optical fiber routing mat 100, in accordance with an embodiment of the present invention. In the Figure, optical fiber routing mat 100 is depicted comprising mat layer 104 and mat layer 106. Optical fiber routing mat 100 is fabricated by placing optical fibers 102, emanating from optical fiber connector 108, on a surface of mat layer 104. In one embodiment, optical fibers 102 are placed via automated assembly equipment. Optical fibers 102 are coupled to mat layer 104. In one embodiment, optical fibers 102 are coupled to mat layer 104 by a pressure sensitive adhesive coupled with or applied to a surface of mat layer 104. After optical fibers 102 are coupled with mat layer 104, a surface of mat layer 106 is coupled with the surface of mat layer 104 which is coupled with optical fibers 102. In one embodiment, mat layer 104 and mat layer 106 are fabricated of a polyimide material. In another embodiment, mat layer 104 and mat layer 106 may be fabricated of a polyester film, for example, Mylar®. In a further embodiment, mat layer 104 and mat layer 106 may be fabricated of one of a plurality of materials known in the art that provide enough structure and stability to prevent damage to the optical fibers routed between them. In an embodiment, mat layer 106 may include a pressure sensitive adhesive on the side that couples to mat layer 104. In another embodiment, mat layer 106 may be a conformal coating dispensed over optical fibers 102 and mat layer 104.

Figure 2A:
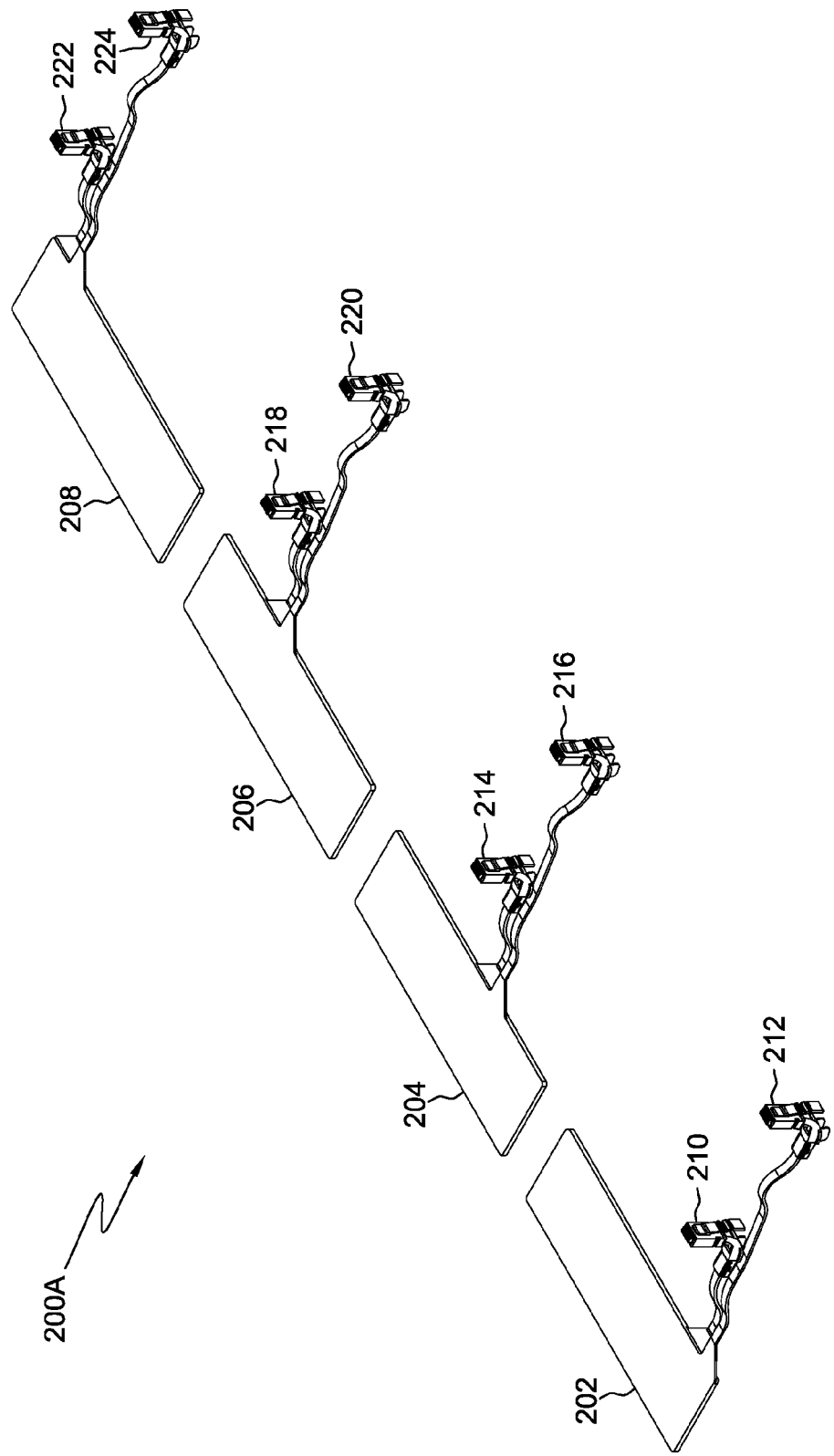
FIG. 2A depicts an isometric view of a first example of an optical fiber routing mat, in accordance with an embodiment of the present invention.

FIG. 2A depicts an isometric view of a first example of optical fiber routing mat 200A, in accordance with an embodiment of the present invention. Optical fiber routing mat 200A includes four sections: section 202, section 204, section 206, and section 208. In the depicted embodiment, each section is coupled with two optical fiber connectors. For example, section 202 is coupled with optical fiber connectors 210 and 212, section 204 is coupled with optical fiber connectors 214 and 216, section 206 is coupled with optical fiber connectors 218 and 220, and section 208 is coupled with optical fiber connectors 222 and 224. In another embodiment, one optical fiber connector is coupled with each section. In a further embodiment, more than two optical fiber connectors are coupled with each section. In the depicted embodiment, the four sections of optical fiber routing mat 200A are not coupled with each other. In the embodiment, each of the four sections includes optical fibers routed from a single column in a PCB with four columns. Because the four sections are not coupled with each other, optical fibers routed within a section, for example, section 202, route signals from integrated circuit (IC) packages within the column to which section 202 is associated, for example, from optical fiber connector 210 to optical fiber connector 212.

Figure 2B:
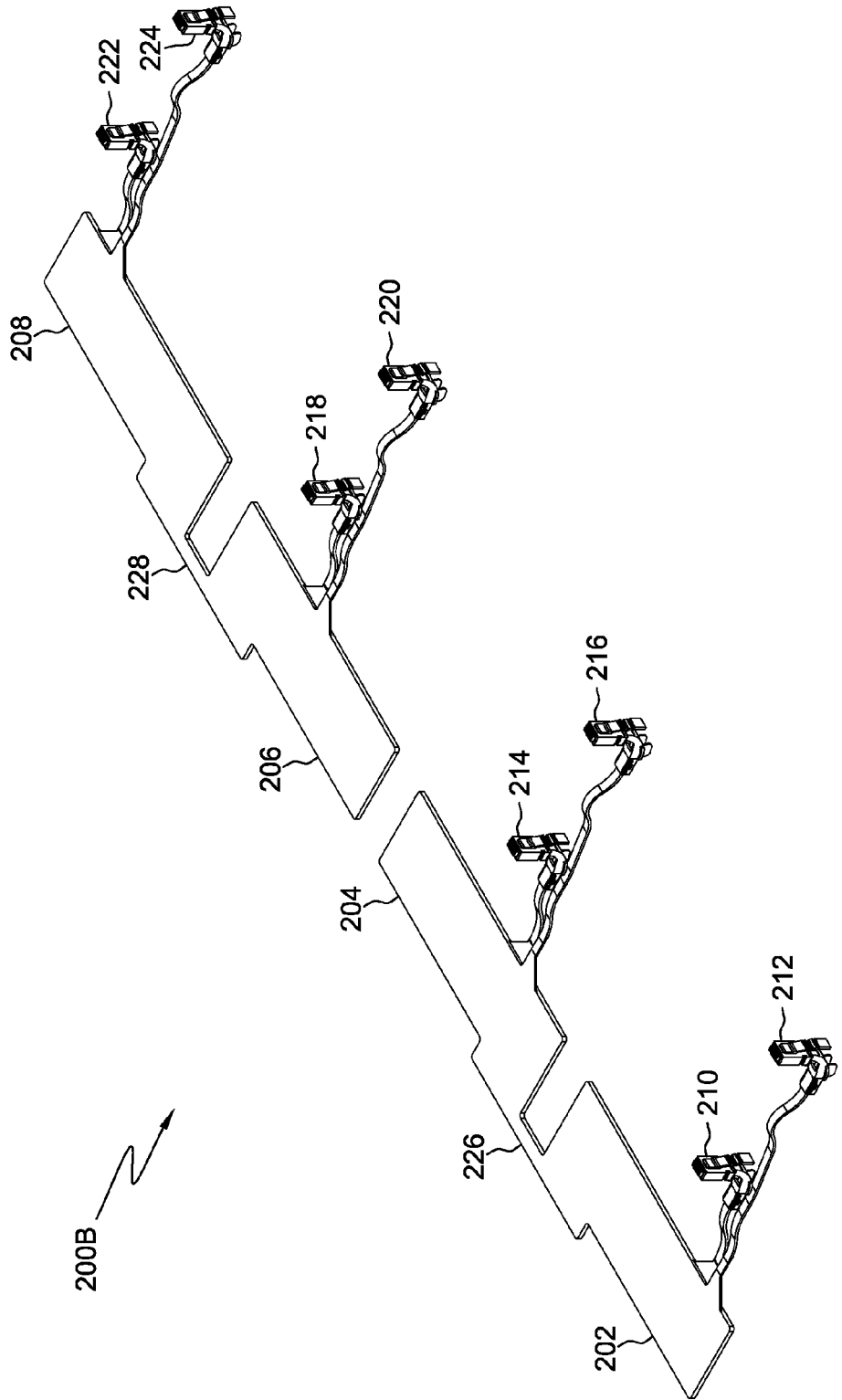
FIG. 2B depicts an isometric view of a second example of an optical fiber routing mat, in accordance with an embodiment of the present invention.

FIG. 2B depicts an isometric view of a second example of optical fiber routing mat 200B in accordance with an embodiment of the present invention. Optical fiber routing mat 200B includes four sections: section 202, section 204, section 206, and section 208. In the depicted embodiment, each section is coupled with two optical fiber connectors. In another embodiment, one optical fiber connector is coupled with each section. In a further embodiment, more than two optical fiber connectors are coupled with each section. In the depicted embodiment, two of the four sections of optical fiber routing mat 200B are coupled with each other. For example, section 202 is coupled with section 204 via bridge 226. In another example, section 206 is coupled with section 208 via bridge 228. Bridge 226 and bridge 228 are extensions of the two layers of material from which optical fiber routing mat 200B is fabricated, as discussed with respect to FIG. 1B. In one embodiment, bridge 226 and bridge 228 are narrow with respect to the width of a full section, but wide enough to accommodate one or more optical fibers. Optical fibers within optical fiber routing mat 200B can be routed through bridge 226 and bridge 228 to enable an electronic coupling of section 202 to section 204 and of section 206 to section 208. In the embodiment, each of the four sections includes optical fibers routed from a single column in a PCB with four columns. Because of the coupling between sections, optical fibers routed within a section, for example, section 202, can route signals from IC packages within the column to which section 202 is associated, for example, from optical fiber connector 210 to optical fiber connector 212, as well as routing signals to and from IC packages in a neighboring column i.e., the column to which section 204 is associated.

Figure 2C:
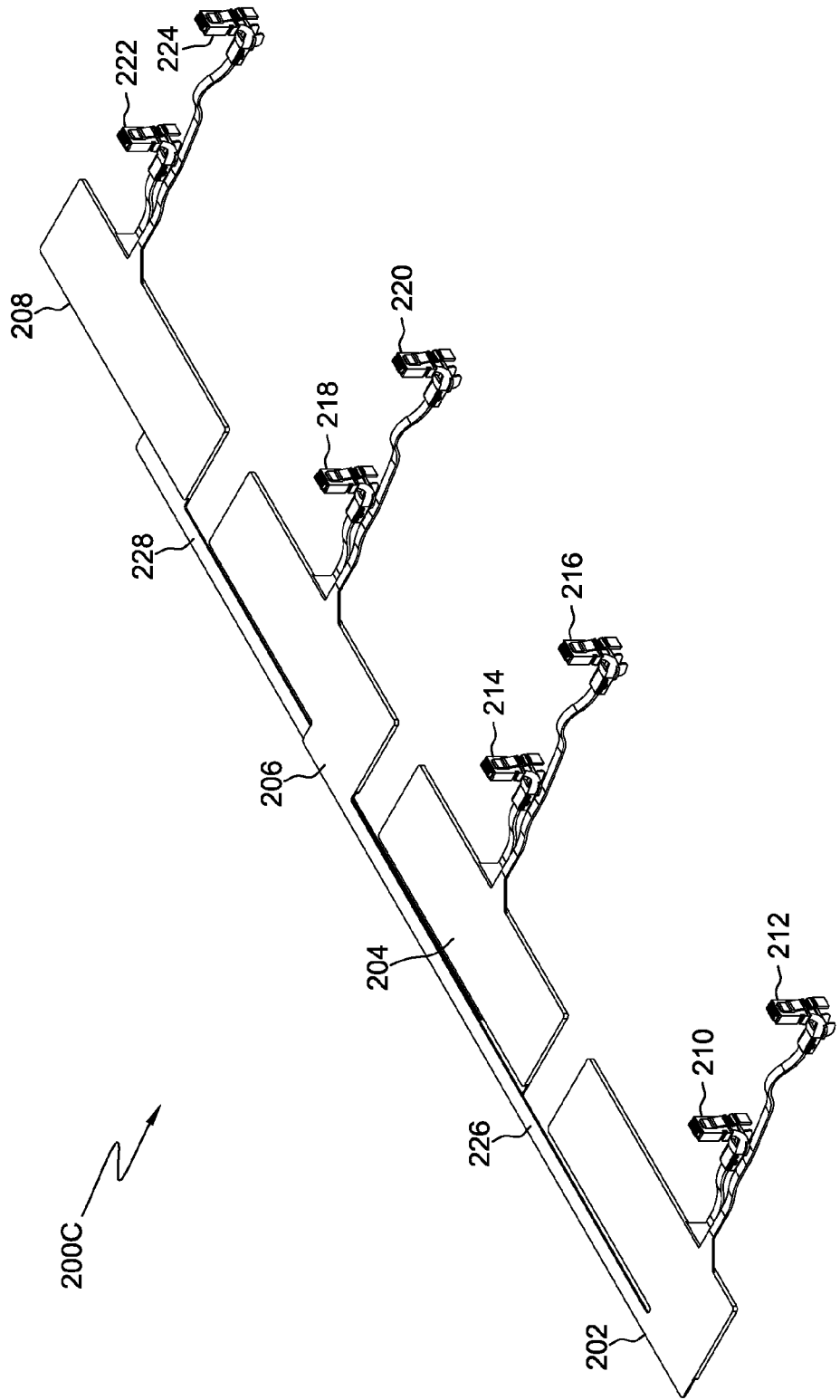
FIG. 2C depicts an isometric view of a third example of an optical fiber routing mat, in accordance with an embodiment of the present invention.

FIG. 2C depicts an isometric view of a third example of optical fiber routing mat 200C in accordance with an embodiment of the present invention. Optical fiber routing mat 200C includes four sections: section 202, section 204, section 206, and section 208. In the depicted embodiment, each section is coupled with two optical fiber connectors. In another embodiment, one optical fiber connector is coupled with each section. In a further embodiment, more than two optical fiber connectors are coupled with each section. In the depicted embodiment, two of the four sections of optical fiber routing mat 200C are coupled with each other. For example, section 202 is coupled with section 206 via bridge 226. In another example, section 204 is coupled with section 208 via bridge 228. Bridge 226 and bridge 228 are extensions of the two layers of material from which optical fiber routing mat 200C is fabricated, as discussed with respect to FIG. 1B. In one embodiment, bridge 226 and bridge 228 are narrow with respect to the width of a full section, but wide enough to accommodate one or more optical fibers. Optical fibers within optical fiber routing mat 200C can be routed through bridge 226 and bridge 228 to enable an electronic coupling of section 202 to section 206 and of section 204 to section 208. In the embodiment, each of the four sections includes optical fibers routed from a single column in a PCB with four columns. Because of the coupling between sections, optical fibers routed within a section, for example, section 202, can route signals from IC packages within the column to which section 202 is associated, for example, from optical fiber connector 210 to optical fiber connector 212, as well as routing signals to and from IC packages one column removed from section 202, i.e., the column to which section 206 is associated.

Figure 2D:
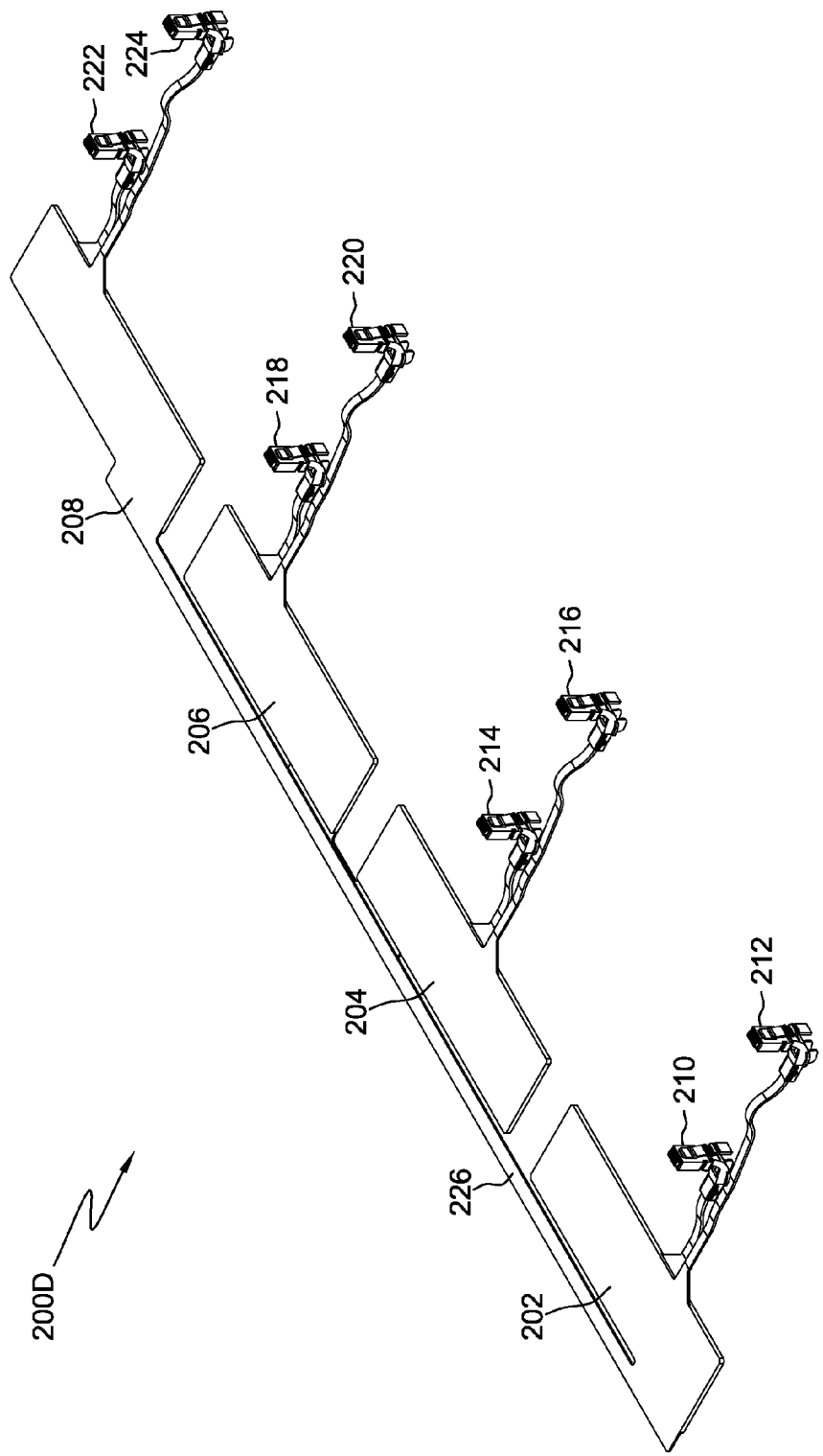
FIG. 2D depicts an isometric view of a fourth example of an optical fiber routing mat, in accordance with an embodiment of the present invention.

FIG. 2D depicts an isometric view of a fourth example of optical fiber routing mat 200D in accordance with an embodiment of the present invention. Optical fiber routing mat 200D includes four sections: section 202, section 204, section 206, and section 208. In the depicted embodiment, each section is coupled with two optical fiber connectors. In another embodiment, one optical fiber connector is coupled with each section. In a further embodiment, more than two optical fiber connectors are coupled with each section. In the depicted embodiment, two of the four sections of optical fiber routing mat 200D are coupled with each other. For example, section 202 is coupled with section 208 via bridge 226. In another example, section 204 is coupled with section 206 via bridge 228 (not shown). Bridge 226 and bridge 228 are extensions of the two layers of material from which optical fiber routing mat 200D is fabricated, as discussed with respect to FIG. 1B. In one embodiment, bridge 226 and bridge 228 are narrow with respect to the width of a full section, but wide enough to accommodate one or more optical fibers. Optical fibers within optical fiber routing mat 200D can be routed through bridge 226 and bridge 228 to enable an electronic coupling of section 202 to section 208 and of section 204 to section 206. In the embodiment, each of the four sections includes optical fibers routed from a single column in a PCB with four columns. Because of the coupling between sections, optical fibers routed within a section, for example, section 202, can route signals from IC packages within the column to which section 202 is associated, for example, from optical fiber connector 210 to optical fiber connector 212, as well as routing signals to and from IC packages two columns removed from section 202, i.e., the column to which section 208 is associated. In addition, optical fibers routed within a section, for example, section 204, can route signals from IC packages within the column to which section 204 is associated, for example, from optical fiber connector 214 to optical fiber connector 216, as well as routing signals to and from IC packages in a columns neighboring section 204, i.e., the column to which section 206 is associated.

FIG. 2E depicts an isometric view of a fifth example of optical fiber routing mat 200E in accordance with an embodiment of the present invention. Optical fiber routing mat 200E includes one section, i.e., section 202. In the depicted embodiment, section 202 is coupled with eight optical fiber connectors, i.e., optical fiber connectors 210 through 224. In another embodiment, section 202 may be coupled with less than eight or more than eight optical fiber connectors. Also coupled with optical fiber routing mat 200E are external optical connectors 230. External optical connectors 230 are present to route optical signals from four columns of a PCB with which optical fiber connectors 210 through 224 are associated to other computing devices in information technology (IT) equipment with which optical fiber routing mat 200E is associated.

As may be evident to one skilled in the art, the embodiments depicted in FIGS. 2A through 2E may be combined into embodiments that contain two or more of the depicted embodiments. In one embodiment that combines all five depicted embodiments in a unified structure, optical fiber connectors in each of sections 202, 204, 206, and 208 may have connectivity to optical fiber connectors in all of the sections 202, 204, 206, and 208, across the different layers, as well as with external optical connectors 230. Such a structure represents an "all-to-all" topology which may be useful in certain aspects of IT equipment design.

Figure 3:
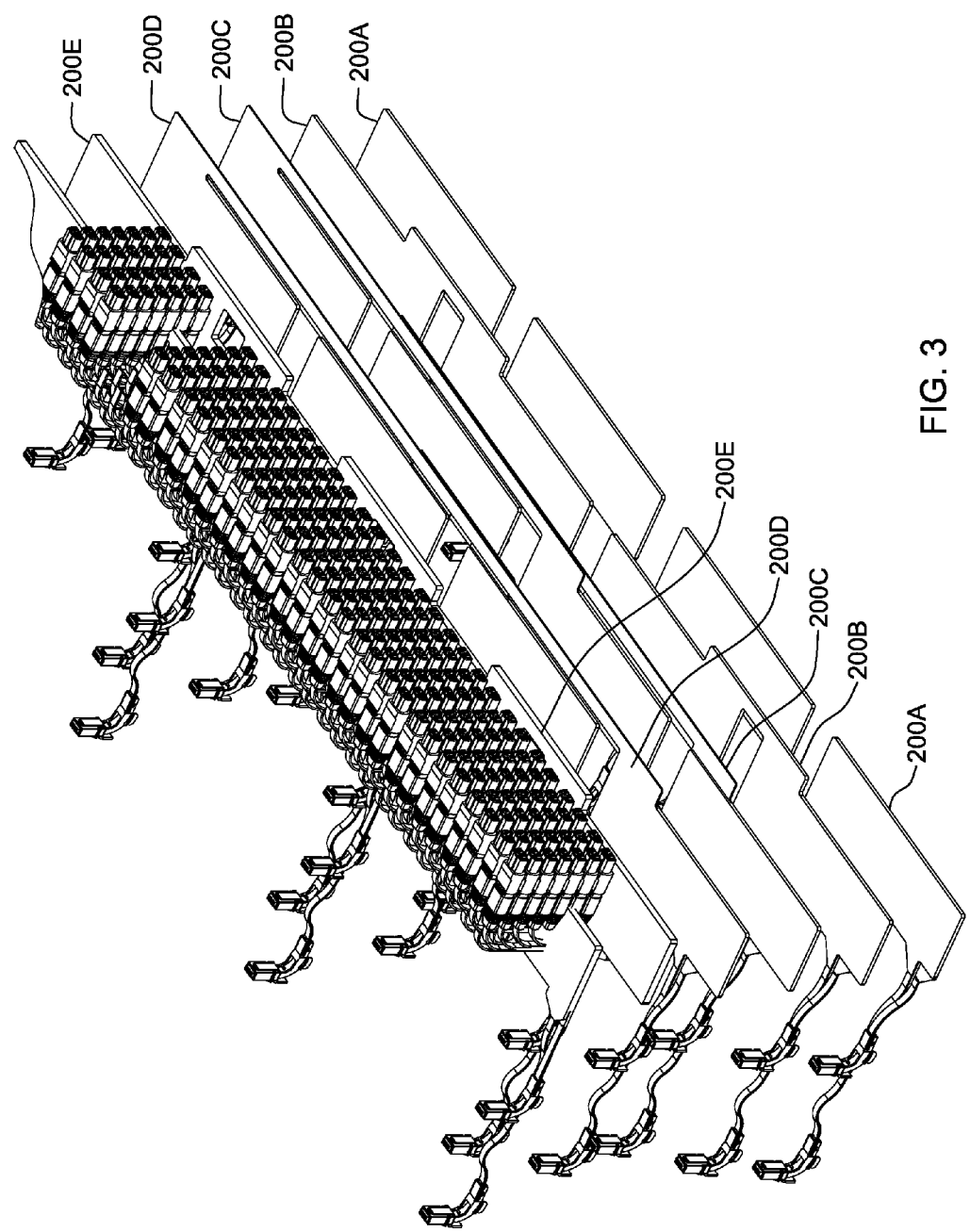
FIG. 3 depicts an exploded isometric view of multiple optical fiber routing mats stacked under external connectors of a printed circuit board assembly, in accordance with an embodiment of the present invention.

FIG. 3 depicts an exploded isometric view of multiple optical fiber routing mats stacked under external connectors of a printed circuit board assembly, in accordance with an embodiment of the present invention. The embodiment depicted in FIG. 3 includes one of each of the examples discussed and depicted with respect to FIGS. 2A through 2E. In another embodiment, the stack of two or more optical fiber routing mats may include two or more of one of the examples discussed and depicted with respect to FIGS. 2A through 2E. In further embodiments, various combinations of the configurations exemplified in FIGS. 2A through 2E may be utilized. The Figure illustrates an embodiment where stacking of multiple optical fiber routing mats in one application enables connections between all IC packages coupled to a four column PCB as well as enabling connections from the IC packages coupled to the PCB to external IT equipment, as described with respect to FIGS. 2A through 2E. Because of the physical nature of the optical fiber routing mats, a high density of optical fibers is routed in a small space while the optical fibers are protected from damage and bent to an acceptable radius. In one embodiment, the various optical fiber routing mats are not physically coupled with each other. In another embodiment, one or more of the optical fiber routing mats may be physically coupled with one or more other optical fiber routing mats. For example, one or more optical fiber routing mats may be coupled via pressure sensitive adhesive placed between two optical fiber routing mats. In another example, one or more optical fiber routing mats may be coupled via a clamping mechanism.

Figure 4:
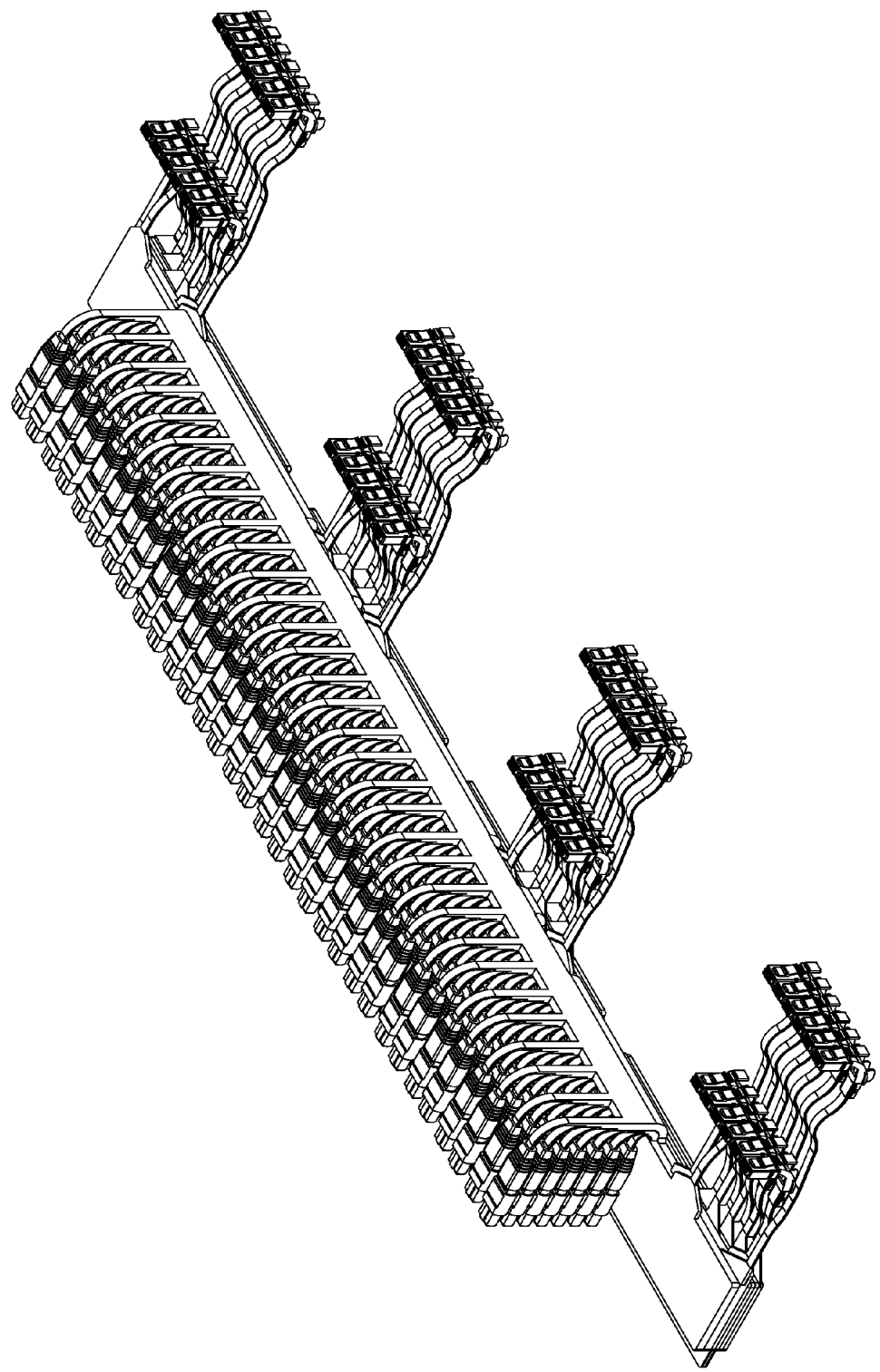
FIG. 4 depicts a front isometric view of several optical fiber connectors exiting multiple stacked optical fiber routing mats, in accordance with an embodiment of the present invention.

FIG. 4 depicts a front isometric view of several optical fiber connectors exiting multiple stacked optical fiber routing mats, in accordance with an embodiment of the present invention. The Figure illustrates eight sets of six adjacent optical fiber connectors. Each set of six optical fiber connectors includes optical fiber ribbons that extend to an optical fiber routing mat in the stack, as depicted with respect to FIG. 3. In the depicted embodiment, the optical fiber connectors couple with eight IC packages, two in each of four columns, on a PCB (not shown). In addition, external optical fiber connectors are available for coupling the PCB with external IT equipment.

Figure 5:
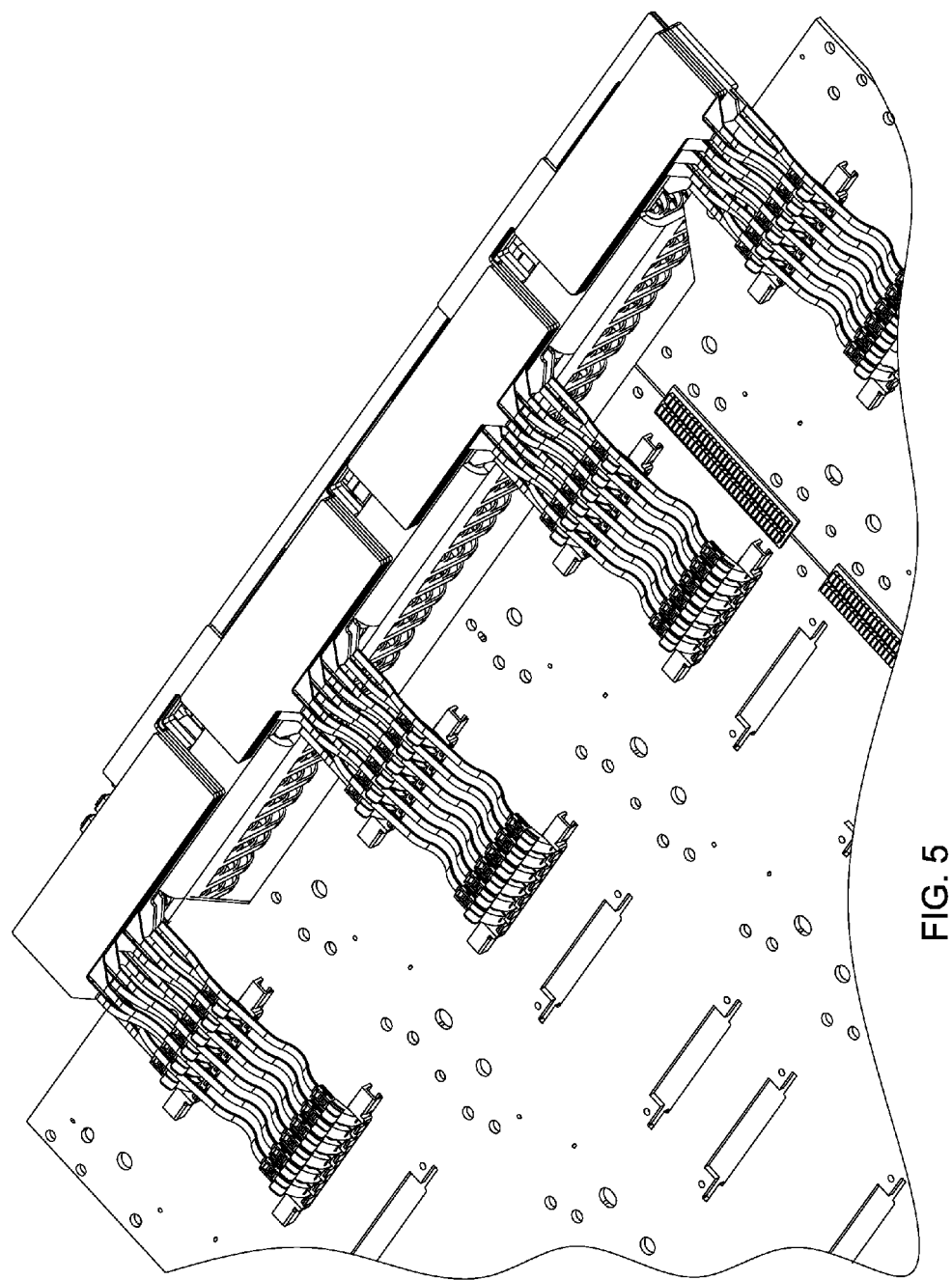
FIG. 5 depicts a bottom-side isometric view of several optical fiber connectors exiting multiple stacked optical fiber routing mats and connecting to a printed circuit board, in accordance with an embodiment of the present invention.

FIG. 5 depicts a bottom-side isometric view of several optical fiber connectors exiting multiple stacked optical fiber routing mats and connecting to a printed circuit board, in accordance with an embodiment of the present invention. In the depicted embodiment, optical fiber ribbons exiting the optical fiber routing mats couple with a single row of IC sites. In another embodiment, one or more additional IC sites on the PCB may be populated, and optical fiber ribbons exiting the optical fiber routing mats couple with one or more rows of IC sites.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A stacked optical fiber routing mat comprising:
   two or more optical fiber routing mats, wherein an optical fiber routing mat comprises:
   a first layer of material and a second layer of material, wherein a surface of the first layer of material is adhesively coupled to a surface of the second layer of material; and
   one or more optical fibers disposed between the first layer of material and the second layer of material, wherein the one or more optical fibers are bent to a radius at least large enough to prevent damage to the one or more optical fibers, wherein the one or more optical fibers emanate from one or more optical fiber ribbons coupled with one or more optical fiber connectors;
   two or more sections of the optical fiber routing mat coupled by a bridge comprised of each of the first layer of material and the second layer of material, wherein a width of the bridge is narrow with respect to a width of the two or more sections of the optical fiber routing mat, and wide enough to accommodate one or more optical fibers;
   one or more optical fibers routed through the bridge; and
   wherein the two or more optical fiber routing mats are coupled to each other in a stacked manner, and wherein at least one of the two or more optical fiber routing mats is coupled with a plurality of external optical connectors.

2. The stacked optical fiber routing mat of claim 1, wherein the two or more optical fiber routing mats are adhesively coupled via adhesive disposed between a first side of a first optical fiber routing mat of the two or more optical fiber routing mats and a first side of a second optical fiber routing mat of the two or more optical fiber routing mats, wherein the first side of the first optical fiber routing mat and the first side of the second optical fiber routing mat are surfaces on which the optical fibers are not disposed.

3. The stacked optical fiber routing mat of claim 1, wherein the first layer of material and the second layer of material are each at least one of a polyimide material and a polyester film.

4. The stacked optical fiber routing mat of claim 1, wherein the first layer of material is a conformal coating dispensed over the one or more optical fibers and the surface of the second layer of material.

5. The stacked optical fiber routing mat of claim 1, wherein the one or more optical fiber connectors are coupled with one or more integrated circuit packages on a printed circuit board.

6. The stacked optical fiber routing mat of claim 1, wherein the two or more optical fiber routing mats are coupled via a clamping mechanism.

* * * * *